United States Patent [19]

Düweg et al.

[11] Patent Number: 5,505,890
[45] Date of Patent: Apr. 9, 1996

[54] PROCESS FOR MANUFACTURING CELLULOSE ACETATE MEMBRANES

[75] Inventors: Gustav Düweg, Wuppertal; Lothar Steinfeld, Schwelm; Wolfgang Ansorge, Essen, all of Germany

[73] Assignee: Akzo N.V., Arnhem, Netherlands

[21] Appl. No.: 325,585

[22] Filed: Oct. 19, 1994

Related U.S. Application Data

[62] Division of Ser. No. 63,331, May 19, 1993, Pat. No. 5,387,345.

[30] Foreign Application Priority Data

May 20, 1992 [DE] Germany .......................... 42 16 658.6

[51] Int. Cl.$^6$ .......................... B29C 47/00; B01D 39/00
[52] U.S. Cl. .................. 264/177.14; 264/178 R; 264/186; 264/187; 264/191; 264/195; 264/200; 210/500.23; 210/500.29; 210/500.3
[58] Field of Search .................. 264/177.14, 177.17, 264/177.18, 177.19, 178 R, 186, 187, 191, 195, 200; 210/500.23, 500.3, 500.29

[56] References Cited

U.S. PATENT DOCUMENTS

| | | |
|---|---|---|
| 3,133,132 | 5/1964 | Loeb et al. . |
| 3,133,137 | 5/1964 | Loeb et al. . |
| 3,170,867 | 2/1965 | Loeb et al. . |
| 3,283,042 | 11/1966 | Loeb et al. . |
| 3,310,488 | 3/1967 | Loeb et al. . |
| 3,344,214 | 9/1967 | Manjikian et al. . |
| 3,364,288 | 1/1968 | Loeb et al. . |
| 3,522,335 | 7/1970 | Rowley . |
| 3,546,209 | 12/1970 | Lipps . |
| 3,888,771 | 6/1975 | Isuge et al. . |
| 4,276,173 | 6/1981 | Kell et al. . |
| 4,610,791 | 9/1986 | Henne et al. . |
| 4,681,713 | 7/1987 | Miyagi et al. . |
| 4,787,977 | 11/1988 | Nakano et al. . |
| 4,808,312 | 2/1989 | Suzuki et al. . |
| 4,822,540 | 4/1989 | Manabe et al. . |
| 4,834,882 | 5/1989 | Kataoka et al. .................. 210/500.23 |
| 4,886,631 | 12/1989 | Suzuki et al. . |
| 4,906,375 | 3/1990 | Heilmann . |
| 4,919,809 | 4/1990 | Yamamoto et al. . |
| 4,925,534 | 5/1990 | Kataoka et al. .................. 210/500.35 |
| 4,980,063 | 12/1990 | Mahoney et al. . |
| 5,080,796 | 1/1992 | Hose et al. . |
| 5,084,349 | 1/1992 | Sasaki et al. . |
| 5,387,345 | 2/1995 | Dünweg et al. .................. 210/645 |

FOREIGN PATENT DOCUMENTS

| | | |
|---|---|---|
| 0249189 | 12/1987 | European Pat. Off. . |
| 0376069 | 7/1990 | European Pat. Off. . |
| 1908344 | 7/1970 | Germany . |
| 2835890 | 2/1980 | Germany . |
| 2943753 | 5/1980 | Germany . |
| 3016542 | 11/1980 | Germany . |
| 3006880 | 9/1981 | Germany . |
| 3220041 | 3/1983 | Germany . |
| 3438531 | 4/1986 | Germany . |
| 381237 | 9/1986 | Germany . |
| 3629925 | 12/1987 | Germany . |
| 52-123983 | 10/1977 | Japan . |
| 57-42740 | 3/1982 | Japan . |
| 64-28123 | 1/1989 | Japan . |
| 1435583 | 11/1988 | U.S.S.R. . |
| 2069925 | 9/1981 | United Kingdom . |

*Primary Examiner*—Ana M. Fortuna
*Attorney, Agent, or Firm*—Oliff & Berridge

[57] ABSTRACT

A dialysis membrane in the form of a hollow fiber with a continuous internal cavity is made of cellulose acetate or a cellulose acetate derivative. The membrane has a maximum screen coefficient of 0.04 for albumin with a molecular weight of 68,000. A dialysis membrane in the form of a hollow fiber with a continuous internal cavity may be made in a process using a spinning solution containing an organic carboxylic acid and a cavity-forming liquid. Modification agents and/or water are optionally added and the solution is extruded through a spinneret suitable for the manufacture of hollow fibers. The precipitation of the resultant dialysis membrane and the usual further aftertreatment take place in a precipitation bath. The organic carboxylic acid preferably is acetic acid and the precipitation bath preferably is a dilute acetic acid.

19 Claims, No Drawings

PROCESS FOR MANUFACTURING CELLULOSE ACETATE MEMBRANES

This is a Division of application Ser. No. 08/063,331 filed May 19, 1993, now U.S. Pat. No. 5,387,345.

FIELD OF THE INVENTION

The invention relates to a dialysis membrane in the form of a hollow fiber with a continuous interior cavity made of cellulose acetate or a cellulose acetate derivative, as well as a process for manufacturing this hollow fiber.

BACKGROUND OF THE INVENTION

Cellulose acetate membranes, which can occur in any shape, have been known for a long time. Thus, U.S. Pat. Nos. 3,133,132, 3,133,137, 3,170,867, 3,283,042, 3,310,488, 3,344,214, and 3,364,288 describe processes for manufacturing semipermeable membranes, suitable for reverse osmosis or for ultrafiltration. All of these processes, however, involve flat membranes exclusively. The high water content of these membranes means however that they cannot be stored in a dry state. In addition, the above membranes cannot be stored for long periods of time without changes occurring in their quality.

European Patent 376,069 describes biocompatible dialysis membranes, suitable for hemodialysis, in the form of flat membranes, tubular membranes, or hollow-fiber membranes, manufactured from polysaccharide esters and corresponding carboxylic acids.

Soviet Patent Application 1435583 describes a process for manufacturing semipermeable membranes composed for example of acetyl cellulose, with acetyl cellulose being treated in two stages either with acetone and water or with acetic acid and water, and with the first processing bath having the higher concentration of acetone or acetic acid.

Japanese Patent 89-028123 describes a process for manufacturing cellulose ester hollow fibers in which the hollow fibers are produced by melt-spinning a mixture of a cellulose ester and an alcohol, and then passing it through a solution containing salt. The aqueous solution can contain acetic acid.

In Japanese Patent Application 57042740, porous membranes are produced using a solution, one cellulose derivative, and a solvent for this cellulose derivative added to a coagulation bath containing more than 60 wt. % of an organic solvent that is a nonsolvent for the cellulose derivative. The solvent for the cellulose derivative can be acetic acid, among other substances.

German Patent 28 35 890 describes membranes for reverse osmosis that can consist of cellulose acetate for example. These membranes are produced from a solution containing the cellulose derivative, an organic solvent, and a tetracarboxylic acid. The organic solvent can be acetic acid, for example.

Japanese Patent 52123983 describes a process in which the thickness of a membrane wall is increased. The membrane is reacted with a solution of 45 to 55 wt. % aqueous acetic acid.

Finally, German laid open application 19 08 344 describes a process for manufacturing cellulose ester membranes from acetic acid, acetone, and an amine salt as the pore-forming substance.

The above membranes leave something to be desired, however, as far as their biocompatibility and/or separating properties are concerned.

Membranes suitable for dialysis should be maximally biocompatible. A number of conditions must be met for this to be the case.

The substances that influence the biocompatibility of a membrane include albumin and $\beta 2$-microglobulin. $\beta 2$-microglobulin (molecular weight approximately 11,800) is loosely bonded to the surfaces of all cells with nuclei as a part of the main histocompatibility complex. This complex is responsible for the ability of the body's own tissues to tolerate foreign tissue.

$\beta 2$-microglobulin is broken down exclusively in the kidney; the daily production rate for a healthy individual is approximately 150 mg. Dialysis patients and uremics, however, have much higher $\beta 2$-microglobulin serum levels than healthy individuals. It is therefore extremely important to remove $\beta 2$-microglobulin effectively during treatment.

The albumins likewise belong to the serum protein group and constitute the largest group among them. The albumins maintain colloidosmotic pressure and transport low-molecular-weight substances, both the body's own and foreign substances. They also constitute the protein reservoir of the body.

Since the number of albumins is generally reduced in dialysis patients, it is important to keep albumin losses as low as possible during treatment.

Depending on the area of application, a membrane must be able to exhibit good performance parameters, for example screen coefficient at various filtration rates.

Previously, however, membranes that exhibited corresponding screen coefficients for $\beta 2$-microglobulin and albumin at a high ultrafiltration rate (high-flux range) did not achieve these figures at average ultrafiltration rates (middle-flux range) or at low to very low ultrafiltration rates (low-flux range).

On the other hand, however, a membrane that worked well in the low-flux range for example suffered a sharp decline in its separating effect in the high-flux range.

SUMMARY OF THE INVENTION

A goal of the invention is therefore to provide a membrane which exhibits low albumin loss and has high permeability to $\beta 2$-microglobulin. These values should also remain constant for a wide range of ultrafiltration rates. This and other goals are achieved by a membrane of the type mentioned above, characterized by the fact that it has a maximum screen coefficient of 0.04 for albumin with a molecular weight of 68,000.

DETAILED DESCRIPTION OF PREFERRED EMBODIMENTS

Preferably, less than 5 g of albumin with a molecular weight of 68,000 is removed by the dialysis membrane in a 4-hour hemodialysis with an effective dialyzer area of 1 m² and a blood flow of 100 ml/min.

The dialysis membrane is also characterized by a screen coefficient of more than 0.5 for $\beta 2$-microglobulin with a molecular weight of 11,800.

Preferably the dialysis membrane has an ultrafiltration rate of 2 to 200 ml/m²·h·mm Hg.

It has been found to be advantageous for the invention for the dialysis membrane to be composed of cellulose acetate with a degree of acetylation of 2.0 to 3.0 and preferably 2.4 to 2.6.

The term "average acetylation degree" refers to the average number of substituted OH groups per cellulose molecule.

The above goal is likewise achieved by a process for manufacturing a dialysis membrane in the form of a hollow fiber with a continuous interior cavity, with a spinning solution containing an organic carboxylic acid and a cavity-forming liquid, possibly with the addition of modification agents and/or water, being extruded through a spinneret suitable for manufacturing hollow fibers, and then precipitating the dialysis membrane thus formed in a precipitation bath and subjecting it to ordinary further aftertreatment, characterized by the organic carboxylic acid being an acetic acid and by the precipitation bath being a dilute acetic acid.

Preferably the precipitation bath is kept at a temperature between 0° and 16° C.

In an embodiment of the invention, the extruded spinning material is guided for a distance of more than 50 cm through the precipitation bath before the hollow fiber formed is deflected for the first time.

In an embodiment of the invention, the spinning solution contains polyethylene glycol as the modification agent.

Preferably the spinning solution contains glycerine, polypropylene glycol, mixed polymers of ethylene oxide and propylene oxide, or polyvinyl pyrrolidone as modification agents.

Preferably the spinning solution contains 9 to 20 wt. % cellulose acetate, 42 to 91 wt. % acetic acid, 20 to 0 wt. % water, and 18 to 0 wt. % modification agent.

The process according to the invention produces especially good results when the spinning solution contains 10 to 15 wt. % cellulose acetate, 52 to 75 wt. % acetic acid, 18 to 10 wt. % water, and 15 to 10 wt. % modification agent.

Preferably the acetic acid in the precipitation bath is maintained at a concentration between 1 and 20 wt. %.

It has also been found advantageous for the process for the spinneret to be immersed in the precipitation bath and for the hollow fiber to be spun upward.

According to another preferred embodiment of the process, the distance between the spinneret and the precipitation bath is 0.5 to 10 cm, preferably 2 to 5 cm.

The cellulose acetate derivatives that can be used for the invention have a structure described by the following formula:

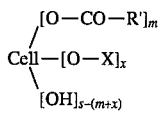

where "Cell" is the structure of the unmodified cellulose molecule or the chitin molecule, both without hydroxyl groups, s is 3 for an unmodified cellulose molecule and 2 for the chitin molecule, and where R': $CH_3$ and/or $C_2H_5$ and/or $C_3H_7$ X: CO—R and/or CS—R and/or CO—$CR''_2$—CO—$CHR''_2$ and/or CO—OR and/or CONH—R and/or CONR''R and/or CSNH—R and/or CSNR''R and/or $SO_2$—R and/or $SO_2NR''R$ and/or SO—R and/or SONR''R and/or $PO_3H_2$ (salt) and/or $PO_2R''R$ and/or POR''$_2$ and/or PO(OR'')$_2$ and/or $CR''_2$—CR''(OH)—R and/or $CR''_2$—CR''(SH)—R and/or $CR''_2$—$CR''_2$—NHR and/or R—COOH (salt) and/or R—$SO_3H$ (salt) and/or R and/or $CH_2$—$CH_2$—NR''$_2$ and/or $CH_2$—$CH_2$—$SO_2$—R, and where R: is alkyl and/or alkenyl and/or alkinyl (straight-chain and/or branched and possibly substituted, with the carbon chain also possibly being interrupted by heteroatoms such as O, S, N, P, Si, and a CO— or COO—group) and/or cycloalkyl (possibly with heteroatoms and/or substituted) and/or aryl and/or arylalkyl and/or arylalkenyl and/or arylalkinyl (possibly with heteroatoms and/or substituted) and/or bisaryl (possibly substituted) and/or residue of a condensed aromatic compound (possibly substituted), and/or residue of a heterocyclic compound (possibly substituted), and "substituted" refers, in addition to the residues in the sense of R, to the following groups as well:

—NR''$_2$ and/or —N$^+$R''$_3$ and/or COOH, also as the salt, and/or —COOR'' and/or CONR''$_2$ and/or —CO—R'' and/or —CSOH also as the salt and/or —CSOR'' and/or —CSNR''$_2$ and/or —$SO_3H$ also as the salt and/or —$SO_3R''$ and/or —$SO_2NR''_2$ and/or —SR'' and/or —SOR'' and/or —SONR''$_2$ and/or —$PO_3H_2$, also as the salt, and/or —PO(OR'')$_2$ and/or $PO_2H(NR''_2)$ and/or —PO (NR''$_2$)$_2$ and/or $PO_2H_2$ and/or —POH(OR'') and/or —CN and/or —$NO_2$ and/or —OR'' and/or halogen and/or —Si(OR'')$_3$ where R'': is H or R, and m: is 0.75 to 2.85 x: is 0.005 to 2.10.

Embodiments of the invention will be described in greater detail in the following examples.

EXAMPLE 1

A spinning solution composed of 62.5 wt. % acetic acid with a concentration of 99.9 wt. %, ]2.5 wt. % cellulose diacetate from linters cellulose with a degree of acetylation of 2.42, 10.5 wt. % water, and 14.5 wt. % polyethylene glycol 400 is extruded through an annular slit nozzle to spin a hollow fiber and placed in a precipitation bath containing 40 g of acetic acid per liter of water. The precipitation bath temperature is 10° C. Simultaneously with the removal of the spinning solution from the bath, an inner filling composed of isopropyl myristate is added through the centrally located internal filling feed into the interior of the hollow fiber as it forms.

The spinneret is located perpendicularly above the precipitation bath, with its outlet opening pointing downward, and the distance from the surface of the precipitation bath is 4 cm. The combined stream of spinning solution and internal filling emerging from the spinneret, after passing through the air gap, sank through the precipitation bath to a depth of 85 cm and is then returned to the surface at an angle by a deflecting roller located in the bath. The spinning rate is 51 m/min. Then the hollow fiber is freed of solvent and accompanying substances by rinsing several times, and finally treated with glycerin. After the wet phase, the hollow fiber is dried in a drum drier at 50° to 65° C.

After drying, the finished hollow fiber is wound up on cross-bobbins. The hollow fiber has an inside diameter of 220μ and a wall thickness of 30μ (with 15% water content and 60% glycerin content).

The hollow fibers have the following characteristics:
Ultrafiltration rate: 180 ml/m²·h·mm Hg
Dialytic permeability for vitamin B12: 16.5 cm/min·$10^{-3}$
Dialytic permeability for creatinine: 48 cm/min·$10^{-3}$
Dialytic permeability for urea: 65 cm/min·$10^{-3}$ The screen coefficient for albumin measured in bovine serum is 0.03.

The screen coefficient measured in bovine serum for β2-microglobulin (measured as cytochrome C) is 0.67.

EXAMPLE 2

Cellulose diacetate hollow fibers according to Example 1 are produced, but after leaving the drum drier (temperature: 45°–55° C.) they are fed to a waving machine. In this machine, the hollow fibers are transported between two layers of V-profiles arranged crosswise, meshing with one another at a spacing of 30 mm and 2.5 mm vertically, while being heated to 45° C. The processing time is one second. Then the hollow fibers are subjected to a wave embossing in the form of crump stretching of 1.5±0.5%. The hollow fibers thus treated are wound up directly into bundles for making dialysis modules. The modules prepared from them have a urea clearance of 187±ml/min with an effective surface area of 1.42 m².

EXAMPLES 3 TO 5

Hollow fibers are produced in the same fashion as in Example 1, but the spinning solutions have the compositions listed in Table 1 below:

|  | Composition of Spinning Solution (in wt. %) | | | |
| --- | --- | --- | --- | --- |
|  | Cellulose Acetate | Acetic Acid | Water | PEG 400 |
| Example 3 | 12.5 | 62.5 | 11.0 | 14.0 |
| Example 4 | 12.5 | 62.5 | 15.0 | 10.0 |
| Example 5 | 12.5 | 62.5 | 18.0 | 7.0 |

The hollow fibers thus produced have the same dimensions as those in Example 1.

The screen coefficient for albumin measured for bovine serum is as follows:

| Example 3 | 0.02 |
| Example 4 | 0.07 (comparison example) |
| Example 5 | 0.11 (comparison example) |

An increase in water content with simultaneous reduction of the content of modification agent thus results in an increase in permeability to albumin.

EXAMPLE 6

A hollow fiber is produced by the method of Example 1 with a spinning solution like that in Example 4. Paraffin oil is used as the internal filling liquid instead of isopropyl myristate. A hollow fiber is obtained with the same properties and dimensions as in Examples 1 to 3; the screen coefficient for albumin measured in bovine serum is 0.03.

What is claimed is:

1. A process for manufacturing a dialysis membrane in the form of a hollow fiber with a continuous internal cavity having a maximum sieving coefficient of 0.04 for albumin with a molecular weight of 68,000, said process comprising:

extruding a spinning solution comprising an organic carboxylic acid and a cavity-forming liquid through a spinneret suitable for the manufacture of a hollow fiber, said spinning solution comprising 9 to 20 wt. % of at least one of cellulose acetate or cellulose acetate derivative, 42 to 91 wt. % acetic acid, 20 to 0 wt. % water and 18 to 0 wt. % modification agent;

precipitating the dialysis membrane thus formed in a precipitation bath; and subjecting the membrane to an aftertreatment.

2. Process according to claim 1, wherein the precipitation bath is a dilute acetic acid.

3. Process according to claim 1, wherein the precipitation bath is kept at a temperature between 0° and 16° C.

4. Process according to claim 1, further comprising guiding the extruded spinning solution for a distance of more than 50 cm through the precipitation bath before initially deflecting the hollow fiber formed.

5. The process according to claim 1, wherein the spinning solution further comprises at least one member selected from the group consisting of glycerin, polypropylene glycol, mixed polymers of ethylene oxide and propylene oxide, and polyvinyl pyrrolidone, as a modification agent.

6. Process according to claim 1, wherein the spinning solution further comprises polyethylene glycol as the modification agent.

7. Process according to claim 1, wherein the spinning solution comprises 10 to 15 wt. % cellulose acetate, 52 to 75 wt. % acetic acid, 18 to 10 wt. % water, and 15 to 5 wt. % modification agent.

8. The process according to claim 1, wherein the precipitation bath comprises acetic acid kept at a concentration between 1 and 20 wt. %.

9. Process according to claim 1, wherein the spinneret is immersed in the precipitation bath and the hollow fiber is spun upward.

10. The process according to claim 1, wherein a distance of 0.5 to 10 cm is maintained between the spinneret and the precipitation bath.

11. The process according to claim 1, wherein a distance of 2 to 5 cm is maintained between the spinneret and the precipitation bath.

12. The process according to claim 1, wherein the maximum sieving coefficient for albumin is 0.03.

13. The process according to claim 1, wherein the maximum sieving coefficient for albumin is 0.02.

14. The process according to claim 1, wherein the dialysis membrane, when used for a 4-hour hemodialysis with an effective dialyzer area of 1 m² and a blood flow of 100 ml/min, removes less than 5 g of albumin with a molecular weight of 68,000.

15. The process according to claim 1, wherein the dialysis membrane has a sieving coefficient of more than 0.5 for β2-microglobulin with a molecular weight of 11,800.

16. The process according to claim 1, wherein the dialysis membrane has an ultrafiltration rate of 2 to 200 ml/m²·h·mm·Hg.

17. The process according to claim 1, wherein the cavity-forming liquid is isopropylmyistate.

18. The process according to claim 1, wherein the cellulose acetate or cellulose acetate derivative has an average acetylation degree between 2.0 and 3.0.

19. The process according to claim 1, wherein the cellulose acetate or cellulose acetate derivative has an average acetylation degree between 2.4 and 2.6.

* * * * *

UNITED STATES PATENT AND TRADEMARK OFFICE
CERTIFICATE OF CORRECTION

PATENT NO. : 5,505,890
DATED : April 9, 1996
INVENTOR(S) : Gustav DUNWEG et al.

It is certified that error appears in the above-identified patent and that said Letters Patent is hereby corrected as shown below:

On the cover page, in Section [75], change "Düweg" to --Dünweg--.

Column 4, line 45, change "]" to --1--.

Signed and Sealed this

Twenty-fifth Day of June, 1996

*Attest:*

BRUCE LEHMAN

*Attesting Officer*    *Commissioner of Patents and Trademarks*